United States Patent [19]

Jones

[11] 4,351,161
[45] Sep. 28, 1982

[54] METHOD AND APPARATUS FOR USING SOLAR ENERGY TO AUGMENT A REFRIGERANT HEATING AND COOLING SYSTEM

[75] Inventor: Richard D. Jones, Denver, Colo.

[73] Assignee: Solar Energy of Colorado, Inc., Denver, Colo.

[21] Appl. No.: 209,981

[22] Filed: Nov. 24, 1980

Related U.S. Application Data

[63] Continuation-in-part of Ser. No. 359,283, Dec. 12, 1977, abandoned.

[51] Int. Cl.³ .................... F25B 27/00; G05D 23/00
[52] U.S. Cl. .................... 62/235.1; 237/2 B
[58] Field of Search .............. 62/235.1; 126/435, 428, 126/430, 436, 437; 237/2 B

[56] References Cited

U.S. PATENT DOCUMENTS

| | | | |
|---|---|---|---|
| 2,428,876 | 10/1947 | Hawkins | 165/18 |
| 2,595,905 | 5/1952 | Telkes | 126/435 |
| 3,991,938 | 11/1976 | Ramey | 237/1 A |
| 4,005,583 | 1/1977 | Ramey | 62/235.1 |
| 4,103,493 | 8/1978 | Schoenfelder | 60/641 |

Primary Examiner—Albert J. Makay
Assistant Examiner—Harry Tanner
Attorney, Agent, or Firm—Fields, Lewis, Pittenger & Rost

[57] ABSTRACT

An uninsulated tank-type solar collector for a reverse-refrigeration-cycle heating system is mounted in ambient air and contains a mass of water and/or ice having a refrigerant expansion coil immersed therein. At least one of the walls of the tank contacts ambient air on one surface, and the mass of water and/or ice on the other surface. Thus, the mass of water and/or ice exchanges or transfers heat from the ambient air by conduction to the expansion coil. During transition from water to ice, the freezing water liberates large amounts of energy as "heat of fusion" which is absorbed by the expansion coil.

5 Claims, 10 Drawing Figures

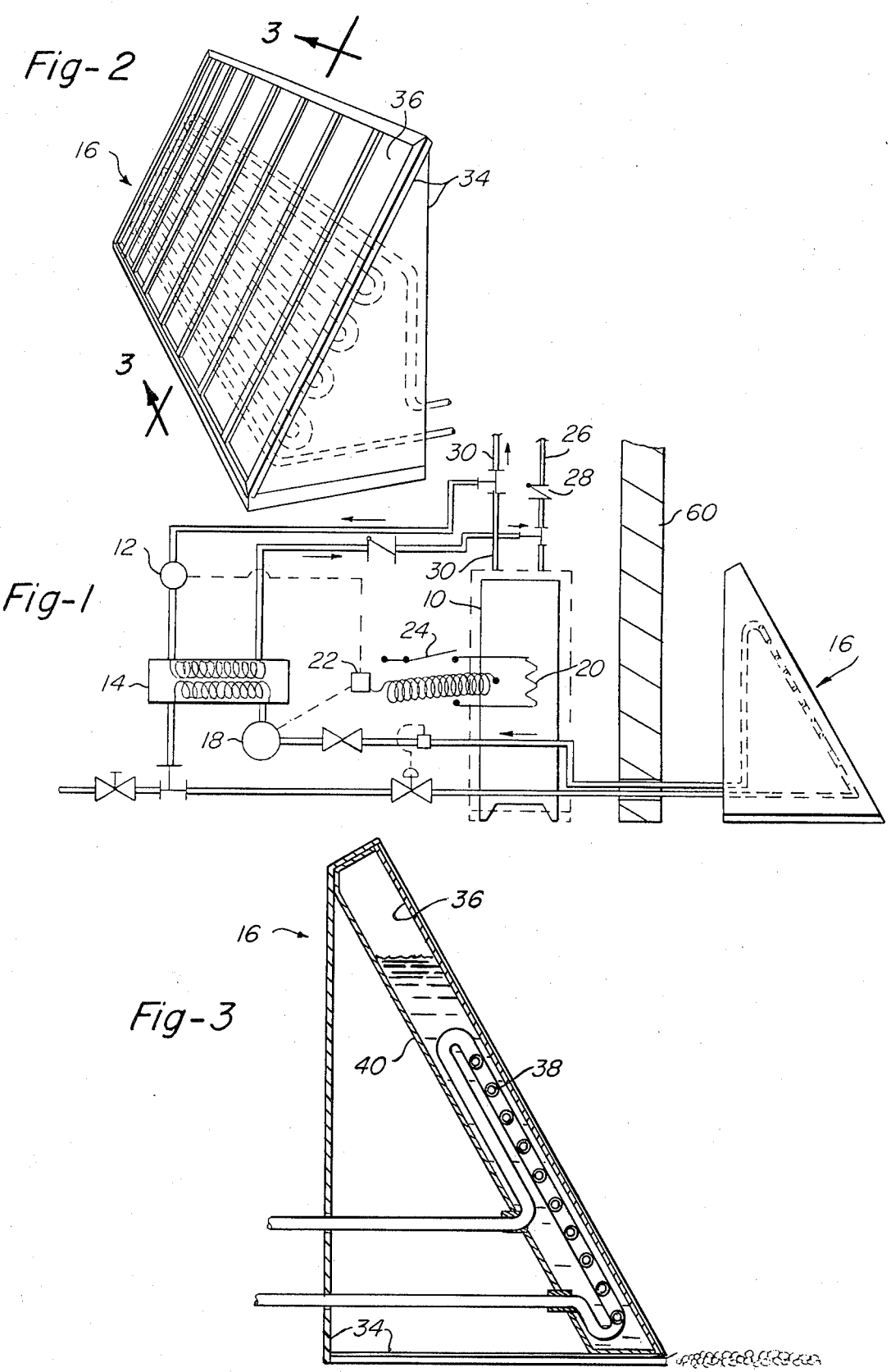

METHOD AND APPARATUS FOR USING SOLAR ENERGY TO AUGMENT A REFRIGERANT HEATING AND COOLING SYSTEM

This application is a continuation-in-part of my U.S. patent application Ser. No. 359,283 filed Dec. 12, 1977, now abandoned.

TECHNICAL FIELD

This invention relates to an uninsulated solar collector wherein water and/or ice conducts heat from a collector plate to an expansion coil of a reverse-refrigeration cycle heating system.

BACKGROUND ART

The present requirements for curtailment of use of fossil forms of energy has led to the increased use of alternative forms, one of which is solar energy. While the radiated energy of the sun is relatively low per unit of area, it may still be harnessed for practical purposes by a solar collector of adequate area. In some instances, a collector may harness all of the energy required for the particular purpose, an example of which is the heating of swimming pools where the desired temperature increase is often small. In others, it may be impractical to collect all of the energy required for a particular purpose and becomes only a substitute for a portion of the energy formerly supplied by fuel. The substituted portion, of course, represents a conservation of such fuel.

In the United States, approximately 14% of the energy used is for residential space and domestic hot water heating. About 29% of this heating load, or about 4% of the total load, is used for domestic hot water. If as much as one half of this load could be supplied by the sun, it would represent a conservation of about 2% of the total energy used in the United States. As will subsequently appear, the present invention can conserve, in each installation, a percentage of energy of such magnitude.

The practicality of heating by a solar energy collector depends, among other things, upon the quantity of heat and ultimate temperature required. For example, the enormous quantity of heat and high temperature thereof required for operating a certain industrial furnace is probably beyond practicality because of solar collector size and necessary elevation of temperature. A domestic hot water heater, however, requires a temperature of the order of only 120°–140° F. and a practical portion of the quantity of heat required may be supplied by a collector of practical size and which may be manufactured for such purpose within economical considerations.

PRIOR ART STATEMENT

There have been numerous devices devised to utilize solar energy in heating homes. One reverse-refrigeration cycle device is disclosed in U.S. Pat. No. 3,991,938 to Ramey. This device discloses evaporator tubes connected to a collector plate mounted on the roof of a building. Water is sprayed over the collector plate and becomes a frozen sheet of ice to enhance transfer of thermal energy to the refrigerant. However, Ramey must reverse his cycle and thaw the ice on the collector plate which then slides down a cover on a roof to the gutter where it is melted and then used for heat exchange duty within the home at the condenser coil. Because of the necessity of reversing the cycle, the device is not very highly efficient.

Another solar collector is shown in U.S. Pat. No. 4,103,493 to Schoenfelder. This device is a super-ambient device which has a collector filled with sand and includes two spaced panels of glass to provide a dead air space adjacent a collector panel. This device, of course, does not utilize heat transferability of ice, nor does it use the latent heat of fusion to convert water to ice.

In addition, U.S. Pat. No. 2,428,876 to Hawkins discloses a subterranean heat sink formed as a reservoir of water having an upper coil through which refrigerant flows to absorb heat from the water and a second set of coils through which ground water or other higher temperature liquid flows in order to place heat back into the reservoir. Conducting elements connect the upper and lower coils to transfer heat between them for the purpose of minimizing any freezing that might occur. A gable roof is located over the reservoir and has glass on one side for transmission of radiant energy and a reflecting surface on the other. This device is a super-ambient system and does not absorb heat from the ambient air.

DISCLOSURE OF THE INVENTION

A primary use of the present invention is for heating a domestic hot water supply which includes a hot water storage tank, the water in which is often heated by a gas burner or electric immersion heater. A portion of the heat input of either of these heat sources is supplied, instead, by a solar heat collector and the remaining portion by a heat pump in the form of a refrigerant gas compressor, usually operated by an electric motor. The electrical energy input to the motor thus provides a portion of the heat required for the water, the remaining portion being supplied by the solar collector. The solar collector comprises a water tank, sometimes frozen to form a block of ice, in which a refrigerant expansion coil is immersed, the water or ice therein forming a heat sink for transferring heat to the expansion coil, the average temperature within which is at or below the instantaneous temperature of the water or ice. Solar heat added to the mass of water or ice may be radiant solar energy or heat conducted thereto by ambient air when the ambient air temperature is above the sink temperature. The refrigerant gas, such as freon, delivered from the expansion coil is then heated by heat of compression and/or waste motor heat and heat from functional losses within the apparatus, a portion of this total heat being transferred to the hot water supply in a heat exchanger, the heat exchanger cooling the gas and condensing it to liquid for recirculation through the solar collector. Advantageously, some additional heat is provided by the ground through which refrigerant pipes run to and from the solar collector.

With the addition of other equipment to this system, space heating may be effected by circulating a portion of the hot water through a space heat exchanger, or alternatively, by providing a space heater and forming a condenser, which is supplied with a portion of the hot gas from the heat pump. By reversing the direction of flow through such space heater, it may receive liquid refrigerant and also serve as an evaporator for space cooling.

Concurrent with the foregoing, one of the general objects of the invention is to provide improvements in solar hot water heating systems.

Another object is to utilize solar radiant energy and heat of ambient air in a heat collector in varying proportions, dependent upon sunshine intensity and ambient air temperature thus rendering the collector operable at all times.

Another object is to provide a collector in which heat energy is transferred by conduction from a collector plate through water and/or ice to an expanding refrigerant gas in a refrigerant expansion coil immersed in the water and/or ice.

Another object is to transfer ambient ground heat to refrigerant pipes running to and from the solar collector.

Another object is to provide a mass of water or ice in contact with the collector plate, forming a heat sink containing a refrigerant expansion coil.

Another object is to utilize the heat of fusion released when the water freezes.

Another object is to add heat of compression to a refrigerant gas which has been evaporated by the collector and transfer a portion of its total heat to a hot water supply circulating through a refrigerant condenser.

A further optional object is to utilize a portion of the heat transferred in the condenser to a space heater.

Another further object is to provide a heat exchanger which may serve as a space heater or cooler.

Another object is to operate the collector at subambient temperature to minimize its heat loss through radiation and conduction to ambient air.

Another object, concurrent with the foregoing object, is to obviate need for glass or insulation in a collector.

Yet another object is to utilize wind energy to enhance heat transfer at the collector.

A further object is to utilize latent ambient air moisture to enhance heat transfer to the collector.

Still further objects, advantages, and salient features will become more apparent from the detailed description to follow, the appended claims, and the accompanying drawing, to now be briefly described.

BRIEF DESCRIPTION OF THE DRAWINGS

FIG. 1 diagramatically illustrates the subject of the invention.

FIG. 2 is an isometric view of an uninsulated solar collector;

FIG. 3 is a section taken on Line 3—3 of FIG. 2 showing a water mass therein which may be frozen under certain conditions;

BEST MODE FOR CARRYING OUT THE INVENTION

Figure 4:
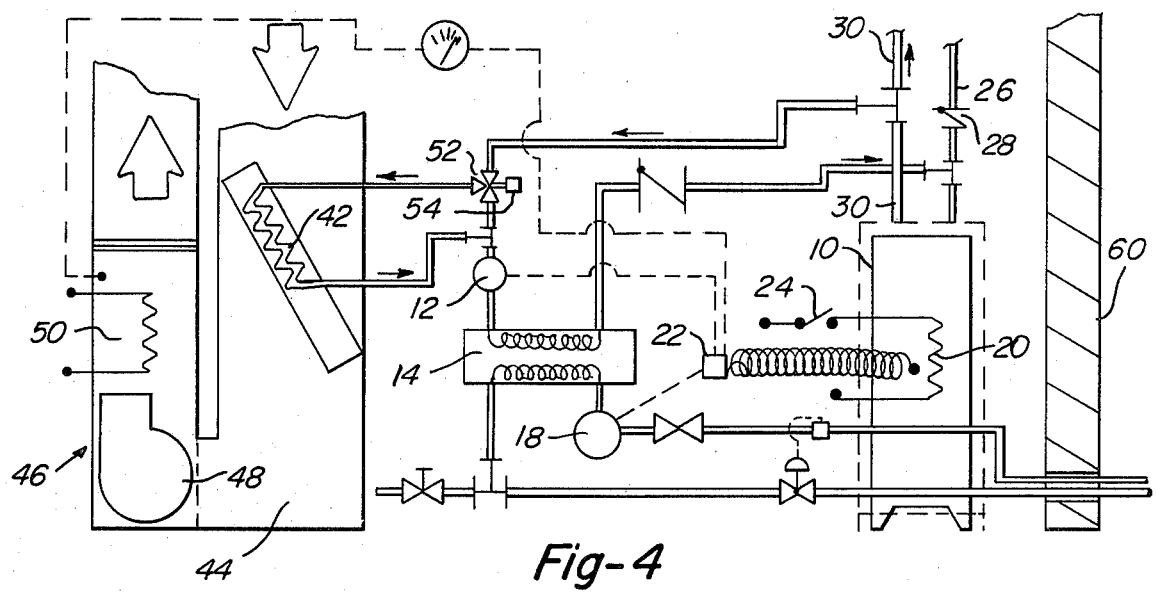
FIG. 4 is like FIG. 1, illustrating the addition of a space heater.

Referring now in detail to the drawing, and first to FIG. 1, the subject of the invention comprises, in general, a domestic hot water tank 10, a hot water circulating pump 12, a heat exchanger-refrigerant condenser 14, a solar collector 16 and a heat pump 18 in the form of a refrigerant gas compressor. Briefly, the pump circulates the water through the heat exchanger and tank, and liquid refrigerant is evaporated in the solar collector, the refrigerant gas thence being heated by compression and condensed in the heat exchanger for recirculation through the solar collector. These components will now be described in greater detail.

Hot water tank 10, as illustrated, is a conventional, usually previously installed tank containing an electrical resistance heating element 20 (or gas burner), a thermostat 22 for controlling water temperature, a manually controlled lin switch 24, a water inlet 26 having a safety back-flow prevention check valve 28 therein and an outlet 30. With the present invention, the manual switch 24 will normally remain open and the thermostat 22 is employed for other controls to be described. It may be closed, however, for standby use of the heating element upon manual demand.

Circulating pump 12 is of any suitable type, such as electrically operated centrifugal, which circulates water through hot water tank 10 and condenser 14 when thermostat 22 calls for its operation.

Condenser 14 may be of any convention form in which tank circulating water may flow in heat exchange relation to a refrigerant which enters the exchanger as a hot gas and is condensed to liquid. The liquid refrigerant discharged from the condenser thence flows to the solar collector, to now be described.

Referring now to FIGS. 2 and 3, solar collector 16, in its several exemplary forms, comprises a suitable A-frame 34 for supporting a collector surface or collector plate 36 at a desired inclination and azimuth to collect the maximum average energy from the sun during the seasons. Thus, collector plate 36 forms a rectangular wall of a tank 40 which contains water in which expansion coil 38 is immersed. Collector plate 36 and tank 40 can be made of any conductive material such as metal or a non-cellular plastic. Conveniently, the back wall of tank 40 is generally parallel to collector plate 36 and expansion coil 38 may be equally spaced therebetween. This permits the transfer of ambient heat, as from the wind, equally from both sides, whereas radiant heat will be absorbed primarily through collector plate 36.

Figure 5:
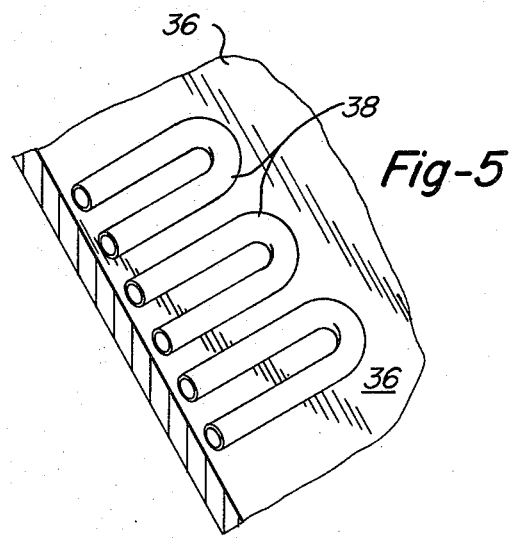
FIG. 5 is an alternative form of collector construction, without a water mass as illustrated in FIG. 3.

In one of its simplified forms, as illustrated in FIG. 5, plate 36 may be of a sheet of metal to which is affixed a refrigerant expansion coil 38 which may be on either of opposite faces, the outer face being coated with a flat black paint for maximum absorption.

Figure 6:
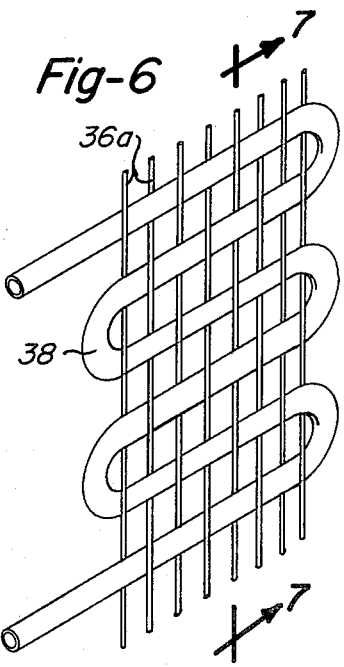
FIG. 6 is another alternative form of collector, utilizing a wire mesh rather than a flat plate to utilize wind energy and latent ambient air moisture to enhance heat transfer.
Figure 6A:
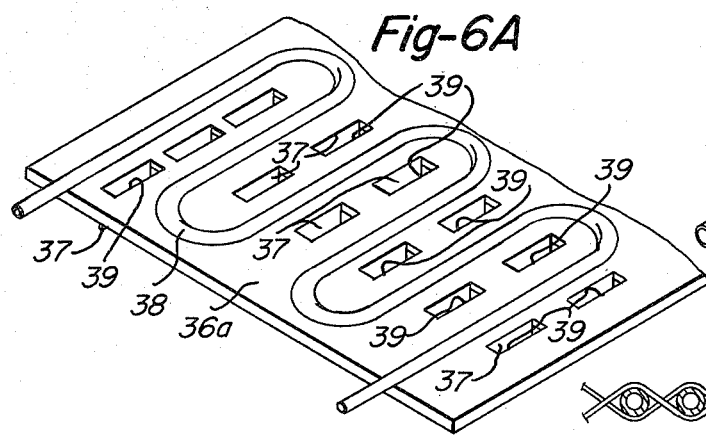
FIG. 6A is a fragmentary perspective view of a collector utilizing a flat plate with flanges for diverting wind through the collector.
Figure 7:
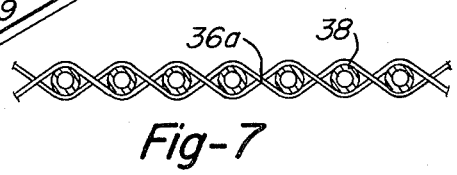
FIG. 7 is a section taken on line 7—7.

Alternatively, as illustrated in FIGS. 6 and 7, the collector surface may be in the form of wire mesh 36a through which coil 38 is threaded. Also, if desired, the collector surface can be formed with fins, such as fins 37 which are bent out of plate 36a of FIG. 6A to form openings 39, the fins serving to divert the ambient wind through the collector openings 39. The wind serves as a source of positive heat transfer increasing the efficiency of heat transfer to the heat sink and/or refrigerant. For example, if the heat transfer value is 1 with no wind, the transfer value increases to 2.5 at 7.5 miles per hour and increases to 4 at 15 miles per hour.

Another feature which is important is the latent or fusion energy created by condensed or frozen moisture on the collector, which is important in the winter when the dew point of the ambient air is close to its temperature. For example, one will get an additional 975 BTU's per pound of condensed moisture on the collector and an additional 144 BTU's per pound due to freezing of this moisture. When one considers that a layer of moisture only 0.003" thick on 64 square feet of collector surface equals one pound and it is not unusual to have frost or ice to form on the collector with a thickness of one-half to three-fourth inches, the additional energy input can be significant.

Furthermore, the temperature of the ground will generally be above that of the refrigerant. Thus, heat energy can also be transferred to the refrigerant from the ground by conduction through the refrigerant pipes leading to and from the solar collector.

One of the advantages of applicant's invention is that it takes advantage of the thermal conductivity properties of ice whereas all prior art devices attempt to get rid of any ice which may form. The following table sets forth the thermal properties of water, ice and air.

TABLE 1

|  | Water | Ice | Air |
|---|---|---|---|
| Specific Heat BTU/lb. °F. | 1.0 at 68° F. | 0.46 at −4° F. 0.48 at 32° F. | 0.25 at 68° F. |
| Thermal Conductivity BTU Hr-Ft²°F./Ft | 0.34 at 68° F. 0.32 at 40° F. | 1.3 at 32° F. | 0.014 at 32° F. |

Since thermal conductivity of ice is 1.3 and of water is 0.32, one might think that ice is a four times better conductor than water.

This is not the case, since the rate of heat transfer through these materials also depends on the mode of heat transfer. For solids (such as ice), the transfer of heat varies with the thermal conductivity. For liquid and gas, the heat transfer varies with the properties of liquids, i.e., viscosity, specific heat and density, as well as with the thermal conductivity.

Therefore, in order to determine the heat transfer through the respective medias of water, ice and air, it is first necessary to calculate the convective heat transfer coefficient. These calculations of convective heat transfer coefficients can be made as follows: Ref. F. Kreith: *Principles of Heat Transfer*, 3rd Edition, pg. 399.

$$Nu_D = 0.53(Gr_D Pr)^{\frac{1}{4}} \text{(Natural Convection)}$$

where
Nu = Nussel Number = (hD)/(K)
Gr = Grashof Number =

$$\frac{\zeta^2 g \beta (Tc - T\infty) L^3}{\mu}$$

Pr = Prandtl Number = (cpµ)/(K)
K = Thermal conductivity
h = Convective heat transfer coefficient
µ = Viscosity of fluid
β = Volume expansion coefficient
cp = Specific heat
g = Gravity force, 32.2 Ft/sec²
ζ = Density of fluid
Water $$Nu_D = 0.53 \left\{ \left[ \frac{\zeta^2 \beta g}{\mu^2} (40° - 20°) \left( \frac{0.75''}{12''} \right) \right]^3 \times 11.6 \right\}^{0.25}$$

$$= 0.53 \{[2.3 \times 10^6 (20) (244 \times 10^{-6})] 11.6\}^{0.25}$$
$$= 0.53 (18.99) = 10.06$$

$$Nu_D = \frac{hD}{K} = 10.06$$

$$h = \frac{10.06 K}{D} = \frac{10.06(0.32)}{\frac{.75}{12}}$$

$$h_{water} = 51 \frac{Btu}{hr \, Ft^2 °F.}$$

Air $$Nu_D = .53 \{[3.16 \times 10^6 (20) \, 244 \times 10^{-6}] \, 0.73\}^{0.25}$$

$$Nu_D = 5.46 = \frac{hD}{K}$$

$$h = \frac{5.46 K}{D} = \frac{5.46(0.014)}{\frac{.75}{12}}$$

$$h_{air} = 1.2 \frac{Btu}{hr \, Ft^2 °F.}$$

Assuming a nighttime condition (no solar radiation) while refrigerant temperature is 20° F. and ambient temperature 40° F.

1. Heat transfer through water is by convection and is governed by equation:

$$Q_{water} = h_w A \Delta T$$

where $h_w$ = convective heat transfer coefficient $$= 51 \frac{Btu}{hr \, Ft^2 °F.}$$

A = surface area, Ft²
ΔT = temperature difference in ambient and refrigerant $$Q_{water} = 51 (1) (40° - 20°) = 1020 \frac{Btu}{hr \, Ft^2} \text{ for water}$$

2. Heat transfer through ice is by conduction and is governed by:

$$Q_{ice} = KA(\Delta T)/(L)$$

where

K = thermal conductivity of ice $$= 1.3 \frac{Btu}{hr \, Ft^2 °F./Ft}$$

= thickness of ice, Ft(¾ inch)

$$Q_{ice} = 1.3 (1) \frac{40}{.75/12} = 416 \frac{Btu}{hr \, Ft^2} \text{ ice}$$

3. Heat transfer through air is by convection and is governed by:

$$Q_{air} = h_a A \Delta T$$

where $h_a$ = convective heat transfer coefficient

= 1.2

$$Q_{air} = 1.2\ (1)\ (40° - 20°) = 24\ \frac{\text{Btu}}{\text{hr Ft}^2}\ \text{air}$$

Based on these calculations, it is readily apparent that water is the best heat transfer medium, then ice and then air. Furthermore, as far as heat storage is concerned, it is apparent that water can store about twice as much as ice and ice can store about twice as much heat as air, as indicated by their respective specific heat shown in the table above. Furthermore, ice is a much better thermal conductor than air.

These calculations show that under the least efficient working conditions, i.e., the evaporator coil being surrounded by a block of ice, the collector of this invention performs better than a coil surrounded by air. Thus, by using ice, the collector can store more heat than a panel in air and, more importantly, can conduct more heat from ambient air to the evaporator coil than would be possible with air alone.

In addition, this invention in an unusual way takes advantage of the thermal storage capabilities of the latent heat of fusion of water. During freezing and thawing (phase change) each pound of water or ice can store or release 144 BTU's/lb° F. of thermal energy compared with the usual 1 BTU/lb° F. for water. Since much of the time the panel will be in a freezing or thawing cycle, the ability to make use of this latent heat of fusion for thermal energy storage, coupled with the fact that the panel is designed to operate at all times in sub-ambient condition, makes this invention unique. It will be understood that in extremely cold climates, anti-freeze may be added to the water to lower its freezing point to a lower temperature to take advantage of using a liquid at lower temperature and to take advantage of the latent heat of fusion at a lower temperature. Therefore, the term "water" as used herein includes both water and water containing an additive to lower its freezing point.

As so far described, collected solar energy is employed only for heating a domestic hot water supply. In many installations sufficient solar energy will be available from the same collector for heating, or at least aiding in the heating of the building.

FIG. 4 illustrates such a system in which the hot water heating system is the same as in FIG. 1, differing in that a portion of the circulating hot water is by-passed through a coil 42 disposed in the plenum 44 of a hot air space heater 46 containing a blower 48 and resistance heating element 50. Obviously, fossil fuel heating can also be used when desired. Such by-pass may be controlled by a two-position valve 52, operated by a solenoid 54 or a heat motor under control of a space air thermostat (not shown).

Figure 8:
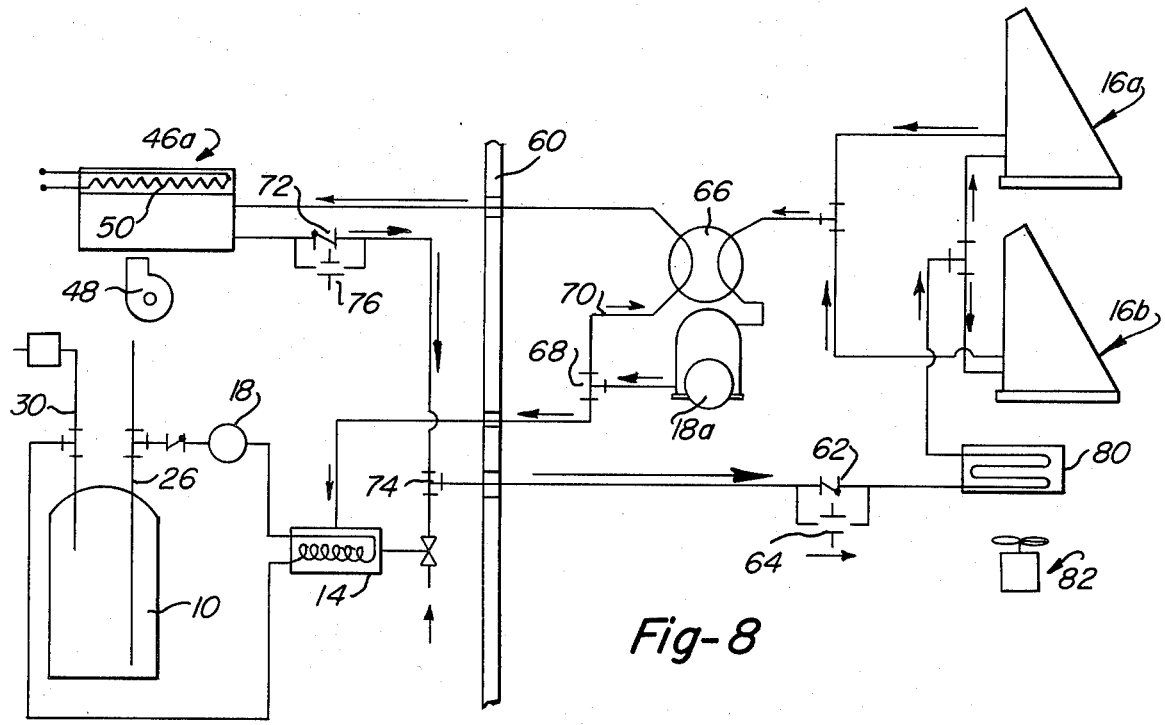
FIG. 8 is similar to FIG. 4, illustrating an alternative form in which a space heater is supplied with hot refrigerant gas rather than with hot water.

FIG. 8 illustrates another modification for space heating in which hot refrigerant gas, rather than water, is employed in a space heater. Since the hot water circulating system is the same as in FIGS. 1 and 4, like parts have been designated by like reference characters and the previous description of operation should suffice. The solar collector system is illustrated as two collectors, 16a and 16b, connected in parallel, rather than a single collector, as in the previous figures. Additional collectors can be added on in parallel as a particular installation requires. On the assumption that each collector is the same size as the collector of the previous figures, its energy collection capacity will thus be doubled. One of the collectors may thus be considered as an add-on or retrofit component to a previously installed solar hot water system, as previously described, wherein its heat collection capacity was insufficient for the desired space heating. Alternatively, as an original installation, two smaller collectors with the equivalent capacity of one larger collector have certain economic advantages in that the collector size may be standardized and two or more identical units may be employed rather than a specialized unit of their combined capacities. The principal differences in the system, as illustrated at the right side of building wall 60, comprise: (1) a check valve 62 disposed parallel to expansion valve 64; (2) compressor 18a of increased capacity over that previously described; and (3) a two position valve 66. Also, the compressor is illustrated as installed outside of the building, rather than inside thereof. With valve 66 disposed as shown, liquid refrigerant is delivered through expansion valve 64, evaporates in the outdoor coil 80 and for the two collectors, and cold gas is delivered to the compressor, as previously described. The compressed hot gas is then delivered to an added T fitting 68 where a portion is delivered by conduit 70 to a space heater 46a where it is cooled and condensed, the condensate flowing through check valve 72, joining the condensate from the hot water heating circuit at another T connection 74. As will be apparent, the hot compressed gas is divided into two circuits, one for heating the hot water and the other for heating the building, the heat exchangers in both circuits serving as condensers for condensing the refrigerant for recirculation through the solar collector system.

Figure 9:
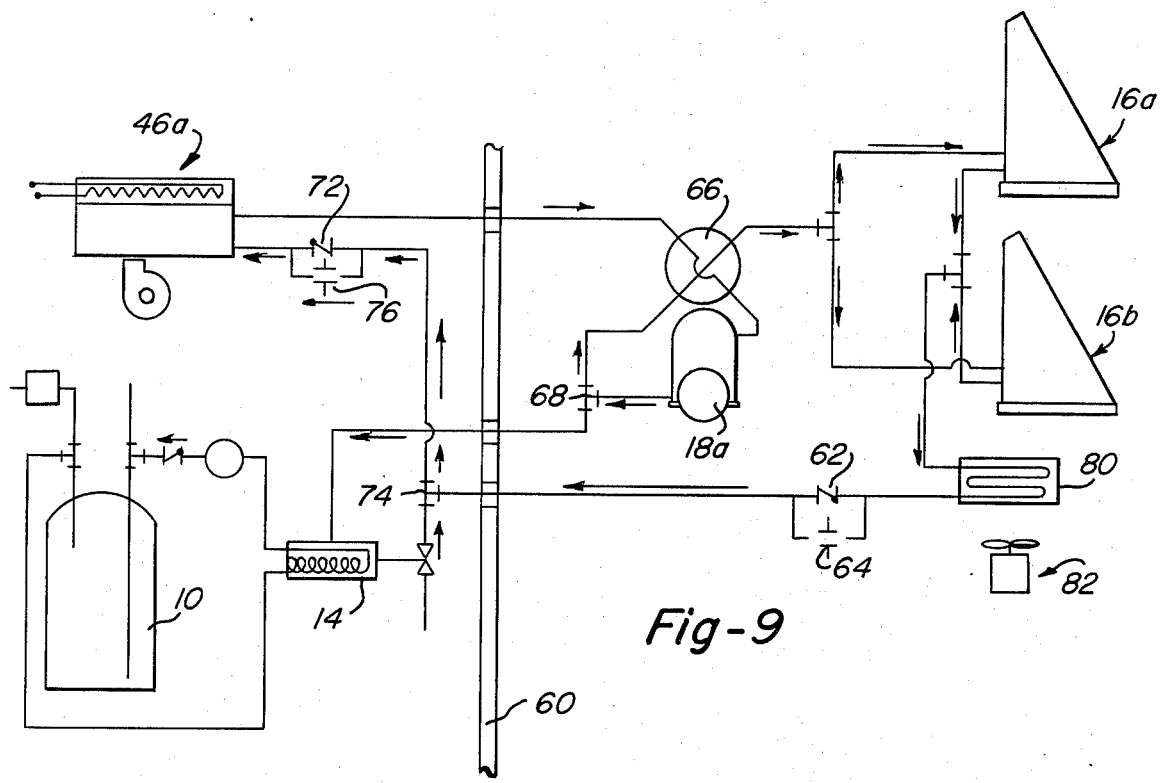
FIG. 9 is the same system as FIG. 8, illustrating a reversed direction of flow in which the space heater is supplied cold liquid refrigerant rather than hot refrigerant gas to effect air conditioning of an air space.

Referring now to FIG. 9, selector valve 66 has been moved to its second position. Hot compressed gas is now delivered to the solar collector system and flows through same in a reversed direction from that shown in FIG. 8. Since the temperature of the hot gas exceeds ambient air temperature and in most cases the temperature of the water standing in the water filled collector, the solar collector now serves as a refrigerant condenser, cooled by ambient air. The remaining condensation and/or liquid subcooling is done in the outdoor coil 80 to remove as much heat as possible. The condensate thence flows through check valve 62, connection 74 and expansion valve 76. As will be apparent, refrigerant flow is now reversed through space heater 46a which now receives liquid refrigerant, rather than hot gas, and evaporation occurs therein, effecting cooling of the air circulating through the space heater.

In summary of the system just described, it will be apparent that in one position of valve 66, it operates in a space heating mode and in the other in a space cooling mode and that in either mode the hot water heating system operates in identical manner.

FIGS. 8 and 9 also illustrate a heat exchanger 80 in series with collectors 16a and 16b, supplied with ambient air by a motor driven blower 82 which may be desired or necessary under certain climatic conditions.

For example, in FIG. 8, when collector 16a and 16b do not receive sufficient solar and ambient heat for adequate refrigerant evaporation, this may be supplemented by ambient air. In like manner, in FIG. 9, when the collectors, now operating as condensers, do not provide adequate condensation, this may be supplemented by ambient air.

From the foregoing, it should be evident that various modifications can be made to the described invention without departing from the scope of the present invention.

What is claimed is:

1. An apparatus for supplying heat within a building, wherein the apparatus includes a heat exchanger in the building, a refrigerant circuit including a refrigerant gas compressor for delivering a relatively hot compressed refrigerant gas to the heat exchanger for circulation therethrough to transfer heat from the refrigerant gas for utilization within the building thereby cooling and condensing the gas to liquid refrigerant, a sub-ambient heat collector in said refrigerant circuit to exchange heat between radiant energy or ambient air and liquid refrigerant delivered to the collector for evaporation in the collector and return of relatively cold gas to said compressor, the improvement in said sub-ambient collector comprising:
   a closed, free-standing uninsulated tank mounted in ambient air, said tank having first and second spaced sides interconnected by end walls, at least said first side wall being a collector plate for absorbing radiant heat and both of said side walls being exposed to the free flow of ambient air for absorbing heat by convection from the ambient air contacting substantially the entire outer surface of each of said side walls;
   a refrigerant expansion coil in said tank connected in said refrigerant circuit to transfer heat from said collector to the liquid refrigerant;
   a mass of water and/or ice substantially filling the remaining space between said side walls and said coil to immerse said coil in said mass, said mass being in continuous surface contact with said collector plate and said second side wall to freely exchange heat with said collector plate and said second side wall and ambient air by conduction and to continuously transfer thermal energy by conduction through said mass to said refrigerant coil.

2. The apparatus of claim 1 wherein:
   said mass is a solid block of ice surrounding said coil and in surface contact with said collector plate and said second side wall.

3. A sub-ambient collector for heating a cold refrigerant as the refrigerant is circulated through a solar heating system to provide heat for use within a building, said sub-ambient collector including:
   a solid block of ice forming a thermal conductor for transfer of heat from ambient air;
   a refrigerant expansion coil immersed in said block of ice for transferring thermal energy conducted by said block of ice from ambient air to a refrigerant passing through said coil; and
   a free-standing tank containing said block of ice, said tank having spaced first and second side walls, said first side wall being a collector plate made of conductive material having a first surface in substantially continuous surface contact with said block of ice and a second and opposite surface positioned to absorb radiant energy and transmit it by conduction to said block of ice and said collector plate and said second side wall both being exposed to ambient air to absorb thermal energy by convection from the air and transmit it by conduction to said block of ice to utilize said block of ice as a thermal conductor for the solar heating system.

4. The apparatus of claim 1 wherein:
   said mass is water surrounding said coil and in surface contact with said collector and said second side wall.

5. A sub-ambient collector for heating a cold refrigerant as the refrigerant is circulated through a solar heating system to provide heat for use within a building, said sub-ambient collector including:
   a mass of water forming a thermal conductor for transfer of heat from ambient air;
   a refrigerant expansion coil immersed in said mass of water for transferring thermal energy conducted by said mass of water from ambient air to a refrigerant passing through said coil; and
   a free-standing tank containing said mass of water, said tank having spaced first and second side walls, said first side wall being a collector plate made of conductive material having a first surface in substantially continuous surface contact with said mass of water and a second and opposite surface positioned to absorb radiant energy and transmit it by conduction to said mass of water and said collector plate and said second side wall both being exposed to ambient air to absorb thermal energy by convection from the air and transmit it by conduction to said mass of water to utilize said mass of water as a thermal conductor for the solar heating system.

* * * * *